United States Patent
Rouyer et al.

(10) Patent No.: US 8,081,620 B2
(45) Date of Patent: Dec. 20, 2011

(54) SYSTEM AND METHOD FOR SUPPORTING LINK AGGREGATION AND OTHER LAYER-2 PROTOCOLS PRIMARILY OVER UNIDIRECTIONAL LINKS

(75) Inventors: Jessy V. Rouyer, Forth Worth, TX (US); Ljubisa Tancevski, Dallas, TX (US); Timucin Ozugur, Fairview, TX (US)

(73) Assignee: Alcatel Lucent, Paris (FR)

( * ) Notice: Subject to any disclaimer, the term of this patent is extended or adjusted under 35 U.S.C. 154(b) by 614 days.

(21) Appl. No.: 11/944,940

(22) Filed: Nov. 26, 2007

(65) Prior Publication Data
US 2009/0135838 A1    May 28, 2009

(51) Int. Cl.
*H04L 12/28* (2006.01)
*H04L 12/56* (2006.01)

(52) U.S. Cl. ............ 370/351; 370/392; 370/401

(58) Field of Classification Search ................ None
See application file for complete search history.

(56) References Cited

U.S. PATENT DOCUMENTS

| | | | |
|---|---|---|---|
| 6,621,790 B1* | 9/2003 | Wils et al. | 370/226 |
| 6,970,473 B1* | 11/2005 | Hara et al. | 370/401 |
| 7,499,445 B2* | 3/2009 | Previdi et al. | 370/351 |
| 2008/0080391 A1* | 4/2008 | Hu et al. | 370/254 |

* cited by examiner

*Primary Examiner* — Chirag Shah
*Assistant Examiner* — Ashley Shivers
(74) *Attorney, Agent, or Firm* — Capitol Patent & Trademark Law Firm, PLLC (57) ABSTRACT

Traffic through a bridge or other network device is directed in a manner that enables link aggregation and other layer-2 protocols to operate fully, even though the device may have as few as a single bidirectional link, with the remaining links being unidirectional. The protocol stack logic of the network device includes shim logic that receives traffic and processes it to determine to where it is to be directed.

19 Claims, 9 Drawing Sheets

| MAC SECURITY | TRAFFIC | IDENTIFIER | SELECTION | | |
|---|---|---|---|---|---|
| | | | TYPE | SHIM LOGIC 500' | SHIM LOGIC 500 |
| NO | LA PDU | ETHERTYPE 88-09 | IN-DIRECT | | MATCHES RECEIVED MAC SA WITH MAC OF CORRESPONDING UPSTREAM PHYSICAL PORT |
| | | | DIRECT | SETS TRANSMITTED MAC DA TO MAC OF CORRESPONDING UPSTREAM PHYSICAL PORT | |
| | CFM PDU FROM A DOWN MEP BELOW THE LAS ON A FACING-DOWNSTREAM PHYSICAL PORT | ETHERTYPE 89-02 AND (RECEIVED MAC SA SAME AS MAC SA OF A FACING-DOWNSTREAM PHYSICAL PORT) | IN-DIRECT | | MATCHES RECEIVED MAC SA WITH MAC OF CORRESPONDING UPSTREAM PHYSICAL PORT |
| | | | DIRECT | NOT POSSIBLE WITH GIVEN IDENTIFIER | |
| | OTHER CFM PDU OR OTHER TRAFFIC | OTHER THAN THE ABOVE-LISTED IDENTIFIERS OR IDENTIFIERS USED WHEN MAC SECURITY SERVICES ARE PROVIDED | IN-DIRECT | | SHIM'S DISTRIBUTION ALGORITHM |
| | | | DIRECT | ANOTHER POSSIBLE ALTERNATIVE | |

FIG. 7

| MAC SECURITY | TRAFFIC | IDENTIFIER | SELECTION | | |
|---|---|---|---|---|---|
| | | | TYPE | SHIM LOGIC 500' | SHIM LOGIC 500 |
| N/A | MAC CONTROL PAUSE OPERATION TRAFFIC | ETHERTYPE 88-08 AND, IN SOME EMBODIMENTS OF THE INVENTION, OPCODE 00-01 | IN-DIRECT | | MATCHES RECEIVED MAC SA WITH MAC OF CORRESPONDING UPSTREAM PHYSICAL PORT |
| | | | DIRECT | SETS TRANSMITTED MAC DA TO MAC OF CORRESPONDING UPSTREAM PHYSICAL PORT | |

FIG. 8

SYSTEM AND METHOD FOR SUPPORTING LINK AGGREGATION AND OTHER LAYER-2 PROTOCOLS PRIMARILY OVER UNIDIRECTIONAL LINKS

BACKGROUND OF THE INVENTION

1. Field of the Invention

The present invention relates generally to computer networks and, more specifically, to maximizing operability of links between packet network elements such as bridges, switches and routers.

2. Description of the Related Art

Packet-switched computer network devices, such as bridges, switches and routers, are connected to each other by physical links, such as cables, that are attached to the devices' physical ports. The links are managed by layer 2 of the well-known seven-layer communication protocol stack model, the Open Systems Interconnection (OSI) Basic Reference Model that defines the protocol stack layers as, from top or layer-7 (most abstract) to bottom or layer-1 (least abstract): Application, Presentation, Session, Transport, Network, Data link, and Physical. A layer in this context is a collection of related functions or logic that provides services to the layer above it and receives services from the layer below it. Examples of well-known layer-2 services or protocols specified by the Institute of Electrical and Electronics Engineers (IEEE) include link aggregation, spanning tree algorithm and protocol, and Connectivity Fault Management (CFM).

Link aggregation in the Ethernet context is defined by a standard promulgated by the IEEE, referred to as IEEE Std. 802.3™-2005, Clause 43 and Annexes 43A, 43B and 43C, and refers to the parallel grouping of two or more physical links such that a logical port treats them as a single logical link. The physical links are aggregated into a link aggregation group, such that a Media Access Control (MAC) client can treat the link aggregation group as if it were a single (logical) link. Stated another way, though the links of a link aggregation group may be attached to several different physical ports, they appear to the MAC client as attached to a single logical port. To this end, IEEE Std. 802.3-2005 specifies the establishment of Data Terminal Equipment (DTE)-to-DTE logical links, consisting of N parallel instances of full duplex point-to-point physical links operating at the same data rate. Link aggregation is typically controlled by logic residing in a Link Aggregation Sublayer (LAS) of layer-2 of the protocol stack logic.

Figure 1:
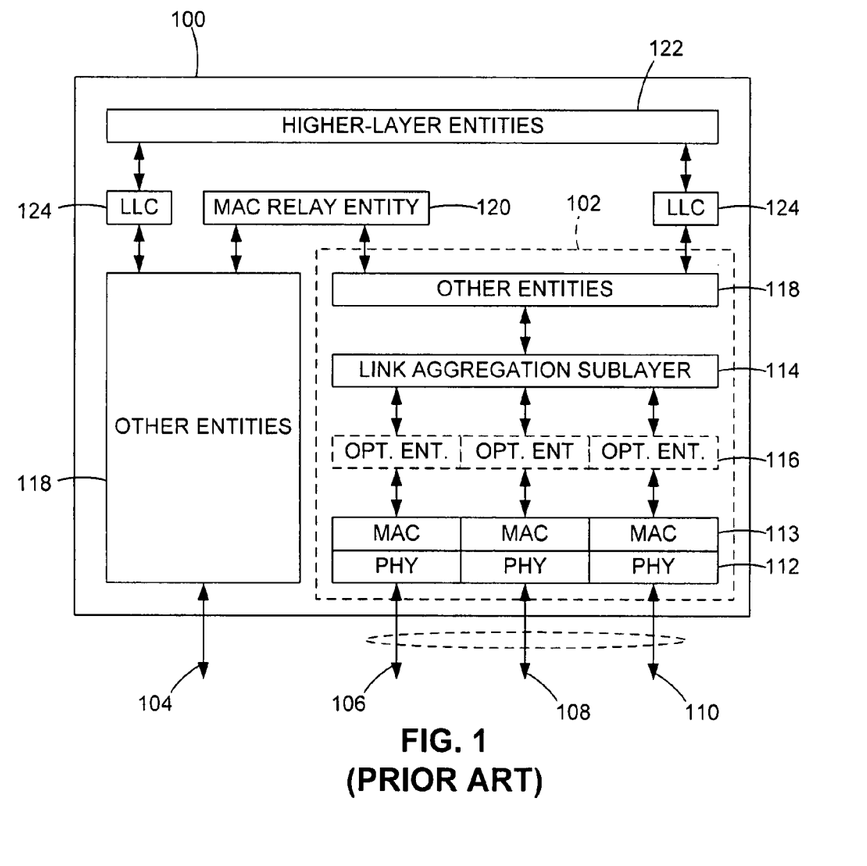
FIG. 1 is a block diagram of the logic of a conventional bridge having aggregated links in accordance with the prior art.

A conventional (prior art) bridge 100 is illustrated in logic diagram form in FIG. 1. The illustrated bridge architecture is typical for a bridge that conforms to IEEE Std. 802.1D™-2004 and IEEE Std. 802.1Q™-2005, but the description below is generally applicable to any similar architectures based on these or any similar standards. The bridge 100 includes communication protocol stack logic 102, and four physical ports attached to four corresponding links 104, 106, 108 and 110. Of the various layers of protocol stack 102, only the Physical layer 112, the MAC layer 113, the LAS 114, and other entities such as optional entities 116 and other entities 118, are shown for purposes of clarity. Examples of optional entities 116 include CFM, as defined by the IEEE P802.1ag draft standard, and MAC Security, as defined by IEEE 802.1AE™-2006. Other entities 118 can generally communicate with each other via a MAC Relay Entity 120 and with higher-layer entities 122 via Logical Link Control (LLC) entities 124. Bridge 100 can communicate traffic with other network elements (not shown in FIG. 1) via links 104-110. (As used herein, the term "traffic" means a series of one or more packets comprising data or control information.) Note that although a link 104-110 can be either bidirectional or unidirectional, dual-ended arrows are shown in this example to indicate bidirectional links for purposes of illustration. Also note that any combination of links 104-110 can be aggregated, as indicated for links 106-110 by the broken-line oval around links 106, 108 and 110, for example. Thus, in this example, network element 100 treats physical links 106, 108 and 110 as a single logical link. Unless otherwise specified as 'logical,' any reference hereinafter to a link refers to a physical link.

As noted above, a physical link can be either unidirectional or bidirectional. In networks with higher volumes of unidirectional traffic than bidirectional traffic, it would be desirable to deploy equipment (e.g., bridges, switches, routers, etc.) that supports as few bidirectional links as possible because a deployment of network equipment that supports bidirectional links can be less economical than a similar deployment that supports a small number of bidirectional links and a higher number of unidirectional links. However, all layer-2 protocols must use bidirectional links to operate fully, i.e., for all features of the protocol to operate exactly in accordance with the standard that defines that protocol.

The present invention addresses these problems and deficiencies and others in the manner described below.

SUMMARY OF THE INVENTION

The present invention relates to a system and method for transferring traffic through a network device that enables link aggregation and other layer-2 protocols to operate fully, even though the device may, in some embodiments of the invention, be attached to as few as a single bidirectional link, with the remaining links being unidirectional. The device can be any suitable piece of network equipment (or network element), such as a bridge, switch, router, etc. Accordingly, the device has protocol stack logic that can be conventional but for the inclusion of shim logic, embodied in accordance with the present invention. As well known in the art to which the invention relates, a shim is hardware, software, or firmware (or combinations thereof) protocol logic inserted between layers or sublayers of an OSI-compliant protocol stack, such as that specified by the IEEE, to translate or otherwise perform operations upon traffic as the traffic is passed between those layers or sublayers. The terms "shim logic" and "protocol stack logic" are used herein to refer to electronic logic embodied in hardware, software, firmware, or combinations thereof.

In accordance with an exemplary embodiment of the invention, the device includes protocol stack logic and a plurality of physical ports. The protocol stack logic supports the device's plurality of physical ports attached to a plurality of unidirectional links capable of receiving traffic on a physical port in only a first direction (and thus not capable of transmitting traffic in a second direction) and a bidirectional link capable of receiving traffic in the first direction and transmitting traffic in the second direction. The protocol stack logic includes shim logic that receives traffic (arriving in either the first or second direction) and processes it to determine where it is to be directed or routed. The traffic received by the shim logic may be associated with any of the unidirectional and bidirectional links. The shim logic can be disposed in a network device that is either on the receiving end (or "downstream") of the unidirectional links (i.e., traffic arriving at such shim logic via the unidirectional links arrives in above-referenced first direction), or on the transmitting end (or "upstream") of the unidirectional links (i.e., traffic leaving such shim logic via the unidirectional links leaves in the above-referenced first direction). Such shim logic can be referred to herein for convenience as downstream shim logic or upstream shim logic, respectively. In some embodiments, a network device can include both downstream and upstream shim logic, even though the device is only disposed either downstream or upstream of the unidirectional links in a given installation, and accordingly only one of the downstream and upstream shim logic would be in use for the duration of that installation.

The shim logic lets all traffic arriving in the first or downstream direction on any link pass through it, i.e., without changing the link on which the traffic is transmitted. However, the shim logic may, as described below, redirect certain traffic arriving in the second or upstream direction, so that the bidirectional link conveys what the unidirectional links cannot convey. More specifically, the downstream shim logic and upstream shim logic operate as follows with regard to traffic arriving in the second or upstream direction.

If downstream shim logic receives traffic arriving in the first or downstream direction, the shim logic passes the traffic through on the physical port attached to the same link on which the traffic arrives. If downstream shim logic determines that traffic arriving in the second or upstream direction is destined to the bidirectional link, the shim logic passes the traffic through on the physical port attached to the bidirectional link. However, if downstream shim logic determines that traffic arriving in the second or upstream direction is destined to one of the unidirectional links, the shim logic redirects the traffic to the physical port attached to the bidirectional link. The downstream shim logic ensures that an identifier is stored in upstream traffic that will allow upstream shim logic to determine which link the upstream traffic was originally destined to (before being directed to the physical port attached to the bidirectional link by downstream shim logic), and to direct that traffic to that link. Such an identifier can be contained in the traffic itself, such as in a header portion of a traffic packet (e.g., the identifier can be an Ethertype, MAC address, or combination thereof), or in one or more "announcement" packets that precede one or more traffic packets.

If upstream shim logic receives traffic arriving in the first or downstream direction, the shim logic passes the traffic through on the physical port attached to the same link on which the traffic arrives. If upstream shim logic determines that traffic arriving in the second or upstream direction was originally destined to the bidirectional link, the shim logic passes the traffic through on the physical port attached to the bidirectional link. However, if upstream shim logic determines that traffic arriving in the second or upstream direction (via the bidirectional link, as the unidirectional links do not carry traffic in that direction) was originally destined to a unidirectional link, the shim logic redirects the traffic to that unidirectional link. The upstream shim logic can determine or select on which link to direct the traffic using a suitable identifier.

In addition, the shim logic can determine whether the traffic is "local" or "non-local." Local traffic comprises packets that the LAS may not be capable of switching or directing to one of the links in a link aggregation group using its LAS distribution algorithm. In contrast, non-local traffic comprises packets that the LAS is capable of switching or directing to one of the links in a link aggregation group. Local traffic can be distinguished from non-local traffic by Ethertype, i.e., a field in an Ethernet frame (part of a packet) indicating the protocol being conveyed in such a frame. Examples of local traffic include Link Aggregation control traffic, CFM traffic aimed at protecting individual links, MAC Security control traffic, and control or data traffic protected by encapsulation with MAC Security. The shim logic lets all traffic arriving in the first or downstream direction on any link pass through it, i.e., without changing the link on which the traffic is transmitted. However, and additionally to the above description, the shim logic may, as described below, make a distinction between local and non-local upstream traffic when redirecting certain traffic arriving in the second or upstream direction. More specifically, the downstream shim logic and upstream shim logic operate as follows with regard to local and non-local upstream traffic arriving in the second or upstream direction.

If the downstream shim logic (and the corresponding upstream shim logic) is configured to make a distinction between local and non-local upstream traffic, the downstream shim logic operates as follows with regard to local and non-local upstream traffic arriving in the second or upstream direction. If the downstream shim logic determines that the upstream traffic is local, it ensures that a suitable identifier is stored in that upstream local traffic, as described above, before directing that traffic to the physical port attached to the bidirectional link. In contrast, if the downstream shim logic determines that the upstream traffic is non-local, the downstream shim logic directs that upstream non-local traffic to the physical port attached to the bidirectional link as is.

If the upstream shim logic (and the corresponding downstream shim logic) is configured to make a distinction between local and non-local upstream traffic, the upstream shim logic operates as follows with regard to local and non-local upstream traffic arriving in the second or upstream direction. The upstream shim logic can determine or select on which link to direct the traffic using, for upstream local traffic, a suitable identifier, and for upstream non-local traffic, a frame distribution algorithm (i.e., the same as that used by the upstream and downstream LAS).

DETAILED DESCRIPTION

Figure 2:
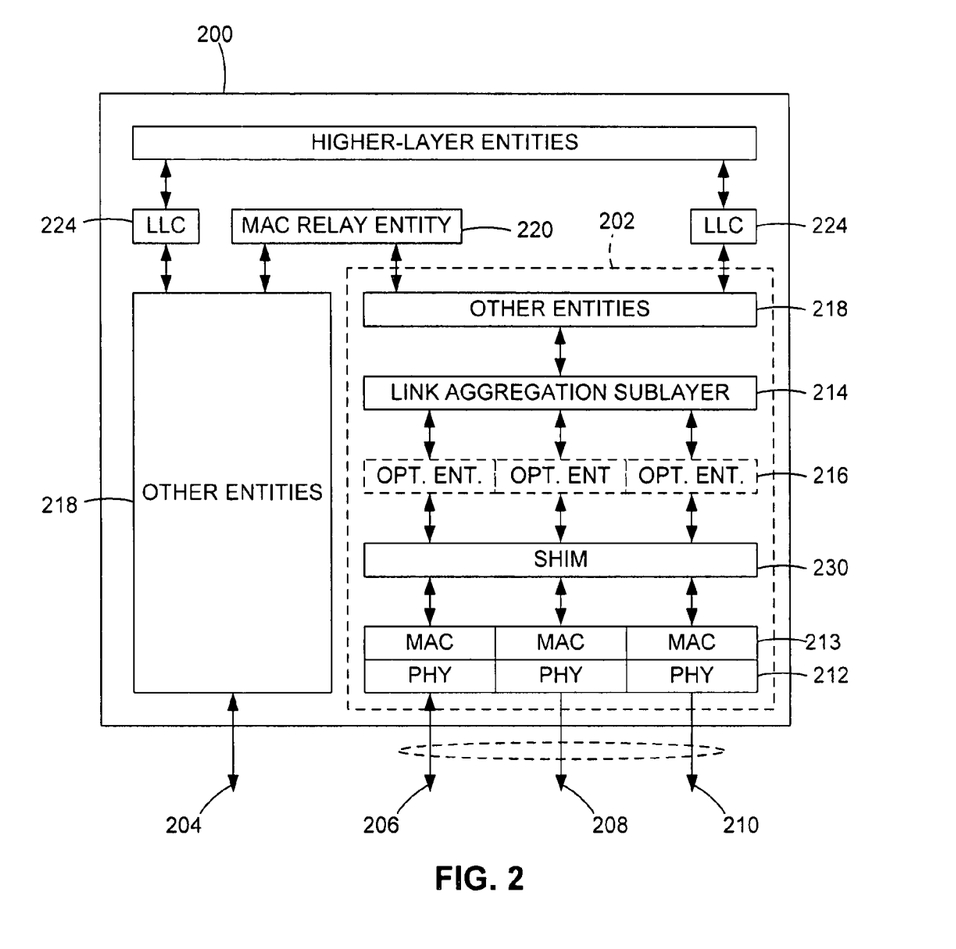
FIG. 2 is a block diagram of the logic of a bridge having shim logic in accordance with an exemplary embodiment of the present invention.

As illustrated in FIG. 2, in an exemplary embodiment of the invention, a bridge 200 includes the novel shim logic 230 of the present invention that enables link aggregation and other layer-2 protocols to operate fully, even though bridge 200 is attached to, in this example, only a single bidirectional link 206, aggregated with (unidirectional) links 208 and 210. (Note that bridge 200 is attached to another bidirectional link 204 that is not relevant to the exemplary embodiment of the invention and operates in the conventional manner but is shown for completeness.) Shim logic 230 is included in the communication protocol stack logic 202, which can comprise any suitable combination of hardware, software, firmware, etc. Bridge 200 includes four physical ports to which links 204, 206, 208 and 210 are attached. In this example, only links 204 and 206 are bidirectional, with the links attached to physical ports 208 and 210 being unidirectional. Although for purposes of illustration link 206 in this example is the bidirectional link, any one of the others could alternatively have been illustrated as the bidirectional link, with the remaining links being unidirectional. Of the various layers of protocol stack 202, only the Physical layer 212, the MAC layer 213, LAS 214, optional layer-2 entities 216, and other entities 218, are shown for purposes of clarity, in addition to the above-mentioned novel shim logic (layer) 230. Note that shim logic 230 is disposed below LAS 214 and above the MAC sublayer so as to remain below any optional layer-2 entity 216 that may require a bidirectional link below it in order to operate properly. Other entities 218 can generally communicate with each other via a MAC Relay Entity 220 and with higher-layer entities 222 via LLC entities 224. Bridge 200 can communicate with other network elements (not shown in FIG. 2) via the physical ports to which links 204-210 are attached. Note that links 206, 208 and 210 are aggregated, as indicated by the broken-line oval. Thus, in this example, bridge 200 treats links 206, 208 and 210 as a single logical port. The operation of such a bridge 200 is described in further detail below with regard to FIGS. 4-6.

Figure 3:
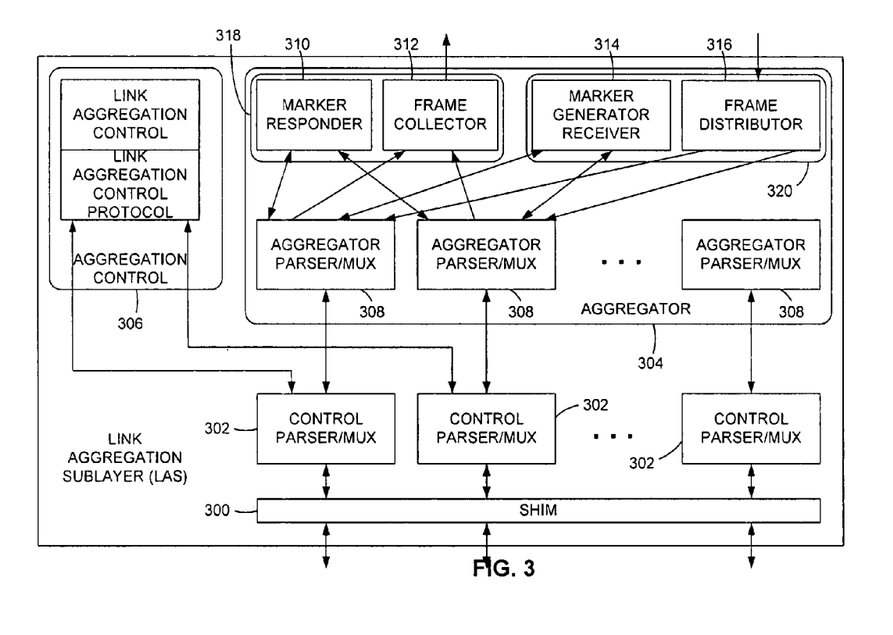
FIG. 3 is a block diagram of the logic of a LAS having shim logic in accordance with an exemplary embodiment of the present invention.

As illustrated in FIG. 3, in an alternative to or variation of the above-described embodiment, the shim logic 300 is part of the Link Aggregation Sublayer (e.g., LAS 214 in FIG. 2) itself, rather than a separate layer. But for the inclusion of shim logic 330, the architecture of the LAS shown in FIG. 3 is conventional and conforms to Subclause 43.2 of IEEE Std. 802.3™-2005. Shim logic 300 is disposed below the control parsers/multiplexers 302, the structure and function of which are well known in the art and therefore not described in further detail herein. The LAS similarly includes an aggregator 304 and aggregation control 306, both of which are similarly conventional and therefore not described in further detail herein. As known in the art, aggregator 304 includes aggregator parser/multiplexers 308 as well as a marker responder 310, frame collector 312, marker generator receiver 314 and frame distributor 316. Marker responder 310 and frame collector 312 together define frame collection logic 318, while marker generator receiver 314 and frame distributor 316 define frame distribution logic 320, as well known in the art. Shim logic 300 can have essentially the same structure and function as described below with regard to other embodiments of the invention.

Figure 4:
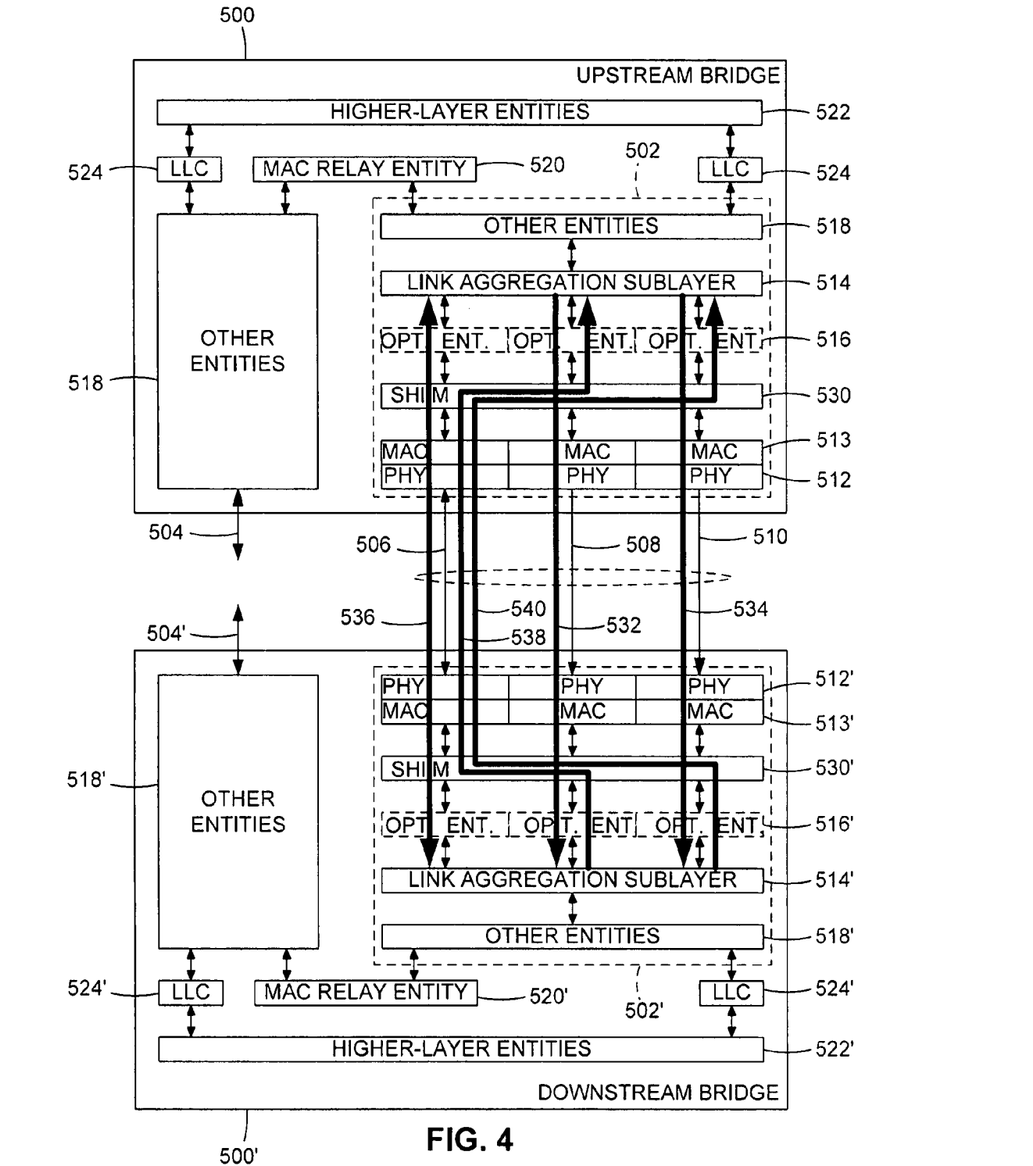
FIG. 4 is a block diagram of the logic of a system comprising two interconnected bridges of the type shown in FIG. 2.

As illustrated in FIG. 4, two bridges 500 and 500', each of which can be of the type described above with regard to FIG. 2, communicate with each other via links 506, 508 and 510 of the type described above with regard to FIG. 2. That is, of the aggregated links 506, 508 and 510, only link 506 is bidirectional; the remaining links 508 and 510 are unidirectional. Thus, as indicated by arrows 532 and 534, the unidirectional links 508 and 510 carry traffic only in the downstream direction from bridge 500 to bridge 500'. As indicated by arrow 536, the bidirectional link 506 carries traffic both downstream from bridge 500 to bridge 500' and upstream from bridge 500' to bridge 500. In addition, as further indicated by arrows 538 and 540, the bidirectional link 506 carries traffic that the unidirectional links 508 and 510 are not capable of carrying, as described below in further detail. It should be noted that although in the exemplary embodiment of the invention the unidirectional links 508 and 510 are described for purposes of illustration as carrying downstream traffic, i.e., from bridge 500 to bridge 500', in other embodiments the unidirectional links can carry upstream traffic, i.e., from bridge 500' to bridge 500. In other words, the terms "upstream" and "downstream" are merely used for reference purposes in the exemplary embodiment with respect to the direction of the unidirectional links 508 and 510 shown in FIG. 4.

Like bridge 200 described above with regard to FIG. 2, bridges 500 and 500' respectively include four physical ports to which links 504, 504', 506, 508 and 510 are attached, as well as communication protocol stack logic 502 and 502'. (Links 504 and 504' are not relevant to the embodiment and operate in the conventional manner but are shown for completeness.) Shim logic 530 and 530' is included in communication protocol stack logic 502 and 502', respectively. The other, conventional layers of communication protocol stack logic 502 and 502' include the Physical layer 512 and 512', the MAC layer 513 and 513', the LAS 514 and 514', optional layer-2 entities 516 and 516', and other entities 518 and 518'. A conventional MAC Relay Entity 520 and 520', higher-layer entities 522 and 522', and LLC entities 524 and 524' are also included.

As described in further detail below, shim logic 530, due to its upstream location in bridge 500, operates differently from shim logic 530' of bridge 500', which operates in a downstream capacity. However it should be noted that shim logic 530 and 530' can each include the logic necessary to serve in both the upstream and downstream capacities. Each shim logic 530 and 530' is configured, either manually (e.g., by a network administrator) or automatically (e.g., via information from the entities below it, e.g., MAC layer 513 and 513') to determine whether it is disposed on an upstream device such as bridge 500 or a downstream device such as bridge 500', to determine which of the physical links attached to physical ports 506, 508 and 510 is configured as bidirectional and which as unidirectional, and to communicate with the entities above it (e.g., optional entities 516 and 516' or LAS 514 and 514') as if all physical ports are attached to bidirectional links (e.g., via appropriate settings of MAC point-to-point and MAC status parameters). It should be appreciated that if all the links in the link aggregation group are bidirectional, shim logic 530 and 530' can be bypassed.

It should be noted that there are two general categories of upstream traffic (i.e., traffic communicated from bridge 500' to bridge 500): local and non-local. It should also be noted that, in the exemplary embodiment of the invention, there is no need to categorize downstream traffic (i.e., traffic communicated from bridge 500 to bridge 500') as local or non-local. Local traffic is upstream control traffic (i.e., in a direction from bridge 500' to bridge 500) that originates at LAS 514' or lower (e.g., at optional layer-2 entity 516'), or is terminated at LAS 514 or lower (e.g., at optional layer-2 entity 516). Examples of (upstream) local traffic include: Link Aggregation Control (LAC) Protocol Data Units (PDUs); Marker PDUs; MAC Security PDUs (either MAC Security control traffic or non-local traffic that is encapsulated for protection by MAC Security); and CFM PDUs (when originated at Down Maintenance association End Points (MEPs) below LAS 514' or terminated at Down MEPs below LAS 514 on each side of a point-to-point aggregate link). Non-local traffic is upstream control or data traffic that originates above LAS 514' (by other entity 518') or farther, e.g., beyond LLC entity 524' or MAC Relay Entity 520', or is terminated above LAS 514 (by other entity 518) or farther, e.g., beyond LLC entity 524 or MAC Relay Entity 520. Examples of (upstream) non-local traffic include: Internet Protocol television (IPTV) traffic (from higher-layer entity 522' via LLC entity 524' or MAC Relay Entity 520', or to higher-layer entity 522 via LLC entity 524 or MAC Relay Entity 520); spanning tree protocols' Bridge PDUs (from spanning tree protocols in higher-layer entity 522', or to spanning tree protocols in higher-layer entity 522); and CFM PDUs (other than those described above). The primary distinction between local and non-local traffic is that LAS 514 or LAS 514' are inherently capable of switching non-local traffic using their distribution algorithm, e.g., in response to the information included in the non-local traffic itself, but may not be capable of switching local traffic.

Figure 5:
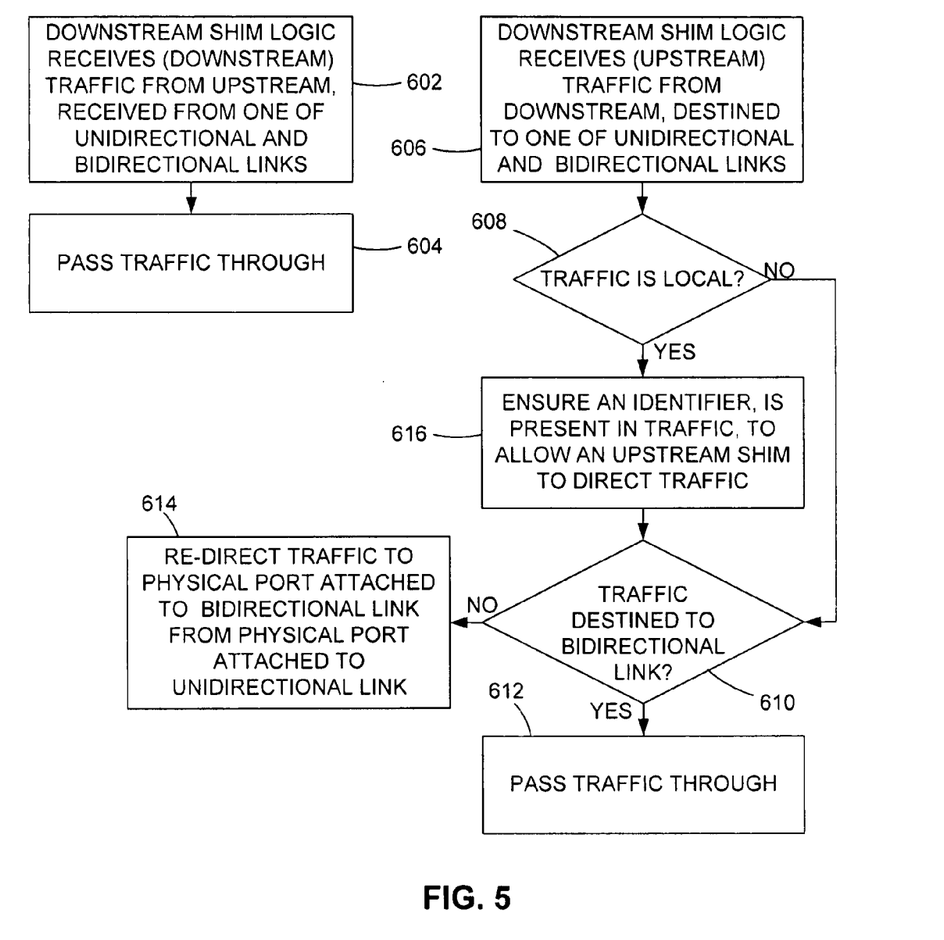
FIG. 5 is a flow diagram, illustrating a method for downstream shim logic to handle traffic between the bridges of FIG. 4.

The (downstream) shim logic 530' operates in accordance with the flow diagram shown in FIG. 5. Persons skilled in the art to which the invention relates will readily be capable of implementing suitable shim logic 530' and integrating it into otherwise conventional communication protocol stack logic 502' in a manner that causes bridge 500' to operate in accordance with the methods indicated in FIG. 5. As illustrated in FIG. 5, there are two main types of traffic that shim logic 530' operates upon: downstream and upstream. Upstream traffic has two subtypes: local and non-local. There is no need to differentiate between subtypes of downstream traffic.

As indicated by steps 602 and 604, in an instance in which (downstream) shim logic 530' receives traffic (arriving in the downstream direction from bridge 500), shim logic 530' passes that traffic through. That is, shim logic 530' does not re-direct that downstream traffic. Specifically, with regard to the exemplary embodiment and with further reference to FIG. 4, if shim logic 530' receives such downstream traffic carried on the bidirectional link 506, shim logic 530' passes that traffic through to any optional layer-2 entity 516' and LAS 514' on that link, as indicated by arrow 536; if shim logic 530' receives such downstream traffic carried on the unidirectional link 508, shim logic 530' passes that traffic through to any optional layer-2 entity 516' and LAS 514' on that link, as indicated by arrow 532; and if shim logic 530' receives such downstream traffic carried on the unidirectional link 510, shim logic 530' passes that traffic through to any optional layer-2 entity 516' and LAS 514' on that link, as indicated by arrow 534. Shim logic 530' can include a suitable parser/multiplexer (not shown) that performs this function.

As indicated by steps 606 and 608, in an instance in which (downstream) shim logic 530' receives traffic arriving in the upstream direction from LAS 514' or an optional layer-2 entity 516', how shim logic 530' operates upon that traffic depends on whether the traffic is local or non-local. If the traffic is non-local, then shim logic 530' passes the traffic through in the manner described above only if the traffic is destined to the bidirectional link, as indicated by steps 610 and 612. However, if the traffic arrives at shim logic 530' destined to one of the unidirectional links 508 or 510, then shim logic 530' re-directs the traffic to the physical port attached to the bidirectional link 506, as indicated by step 614. Shim logic 530' can make this determination or selection by determining whether the physical port to which the traffic is destined is attached to a bidirectional link or a unidirectional link. If attached to a bidirectional link, then shim logic 530' lets such upstream, non-local traffic through. If attached to a unidirectional link, then shim logic 530' re-directs such upstream, non-local traffic to the physical port attached to the bidirectional link 506. More specifically, with regard to the exemplary embodiment and with further reference to FIG. 4, if shim logic 530' receives such upstream traffic destined to the bidirectional link 506, then shim logic 530' passes that traffic through to the MAC entity 513' on that link, as indicated by arrow 536; if shim logic 530' receives such upstream destined to the unidirectional link 508, then shim logic 530' re-directs that traffic to the physical port attached to the bidirectional link 506, as indicated by arrow 538; and if shim logic 530' receives such upstream traffic destined to the unidirectional link 510, then shim logic 530' similarly re-directs that traffic to the physical port attached to the bidirectional link 506, as indicated by arrow 540.

If the upstream traffic is local, then shim logic 530' ensures that an identifier is stored in the traffic packet allowing shim logic 530 to determine which link the upstream traffic was originally destined to (before being directed by shim logic 530' to the physical port attached to the bidirectional link 506), as indicated by step 616. Shim logic 530' passes the traffic through in the manner described above only if the traffic is destined to the bidirectional link, as indicated by steps 610 and 612. However, if the traffic arrives at shim logic 530' destined to one of the unidirectional links 508 or 510, then shim logic 530' redirects the traffic to the physical port attached to the bidirectional link 506, as indicated by step 614. The identifier can be an Ethertype, a combination of an Ethertype and a MAC address (e.g., source MAC address (SA)), or any other suitable combination of an Ethertype and one or more specific fields in the packet (e.g., subtype, Maintenance Association Identifier (MAID), etc.), allowing unique identification of local traffic. Two exemplary ways in which shim logic 530 can use such identifiers to determine which link the upstream traffic was originally destined to (before being directed by shim logic 530' to the physical port attached to the bidirectional link 506) are described in further detail as follows.

One way for shim logic 530 to determine which link upstream traffic was originally destined to (before being directed by shim logic 530' to the physical port attached to the bidirectional link 506) involves an automatic configuration method that relies on direct identification and uses an identifier comprising an Ethertype (and subtype, if needed to uniquely identify local traffic), and the MAC address of the physical port on (upstream) bridge 500 to which the traffic is to be directed by shim logic 530. For example, if the only local traffic consists of LACPDUs, Marker PDUs or Marker Response PDUs, the MAC source address of such PDUs is the MAC address of the physical port on (upstream) bridge 500 that transmitted the PDU downstream. The (downstream) shim logic 530' can associate this MAC address with the physical port having received such PDUs on (downstream) bridge 500'. When shim logic 530' has to direct local traffic upstream, it can replace the Slow_Protocols_Multicast destination MAC address (DA) with this source MAC address (SA). The (upstream) shim logic 530 identifies such traffic by its Ethertype 88-09 (and subtypes 0x01 for LACP and 0x02 for Marker protocols, if needed in the presence of extra "Slow Protocols"). It can then direct such traffic to the entities on the physical port whose MAC address is this destination MAC address (and can also replace the latter by the original Slow_Protocols_Multicast MAC address, which may or may not be expected by entities above (upstream) shim logic 530. It should be appreciated that because LACPDUs are exchanged before non-local traffic can be exchanged, such selection relying on direct identification could therefore be automatically configured before non-local traffic is exchanged, thus leading to an entirely automatic setup.

An alternative way for shim logic 530 to determine which link local upstream traffic was originally destined to (before being directed by shim logic 530' to the physical port attached to the bidirectional link 506) involves a manual configuration method that relies on indirect identification and uses an identifier comprising an Ethertype (and subtype, if needed) and the MAC address of the physical port on (downstream) bridge 500'. For example, if the only local traffic consists of LACPDUs, Marker PDUs or Marker Response PDUs, the MAC source address of such PDUs is the MAC address of the physical port on the (downstream) bridge 500' that is to transmit the PDU upstream. The (upstream) shim logic 530 identifies such traffic by its Ethertype 88-09 (and subtypes 0x01 for LACP and 0x02 for Marker protocols, if needed in the presence of extra "Slow Protocols"). It can then use a manually or administratively configured table (not shown) to match the source MAC address of the physical port on (downstream) bridge 500' with the MAC address of the peer physical port on (upstream) bridge 500. The (upstream) shim logic 530 can then re-direct such traffic to the entities on the matched physical port on (upstream) bridge 500.

It should be appreciated that the presence of other optional layer-2 entities 516 and 516' below LAS 514 and 514' (e.g., the above-described CFM Down MEP, and MAC Security) may militate the use of different identifiers, identifier storage locations or direct or indirect identifications. This is because local traffic from such optional layer-2 entities 516', or to such optional layer-2 entities 516 may not use the same identifiers as those used for LACPDUs, Marker PDUs or Marker Response PDUs. This does not, however, prevent the proper handling of local traffic.

Also, to maintain fully automatic configuration for local traffic (and, by extension, non-local traffic), the presence of other optional layer-2 entities 516 and 516' below LAS 514 and 514' (e.g., the above-described CFM Down MEP, and MAC Security) may require that shim logic 530' extract the identifier from the first local traffic packet (having such an identifier) that it receives. This is because optional layer-2 entities 516 and 516' below LAS 514 and 514' may exchange local traffic before LAS 514 and 514' exchange local or non-local traffic.

Figure 6A:
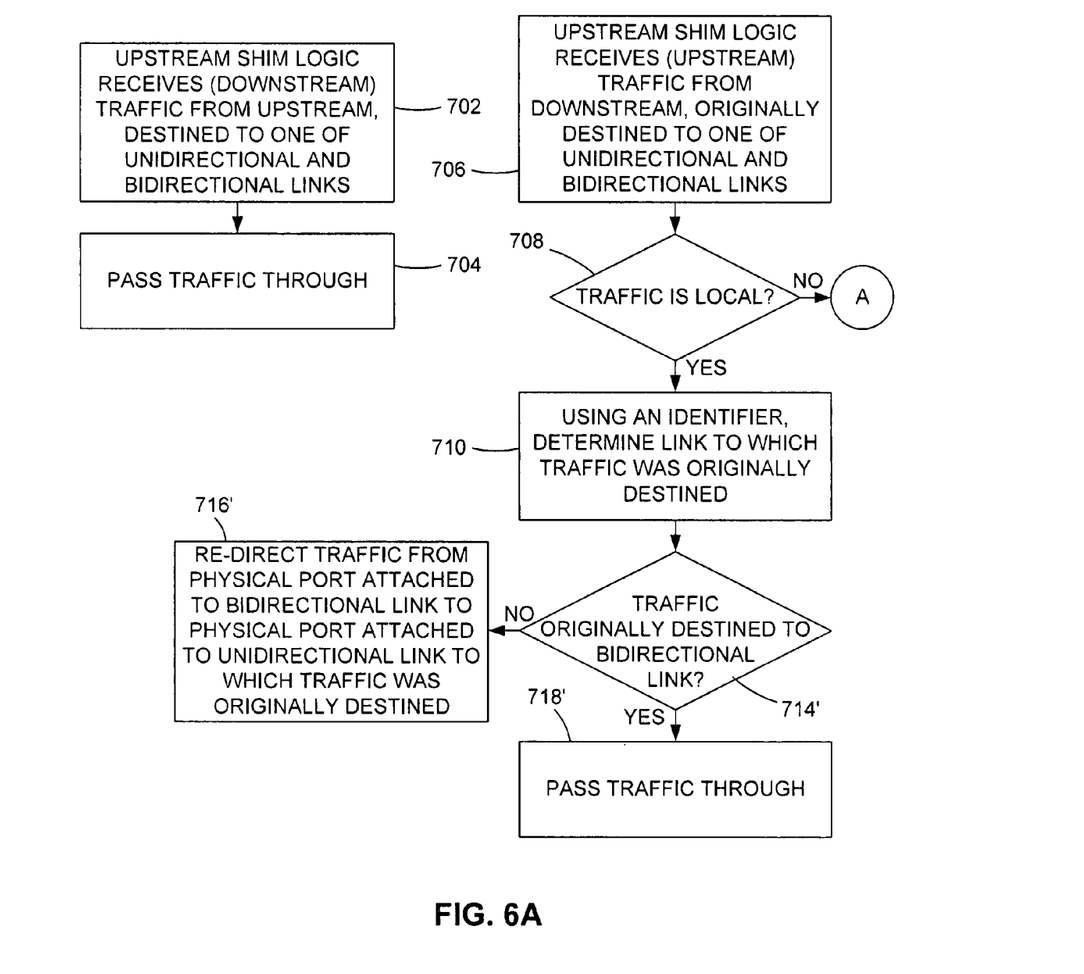
FIG. 6A is a flow diagram, illustrating a method for upstream shim logic to handle traffic between the bridges of FIG. 4.
Figure 6B:
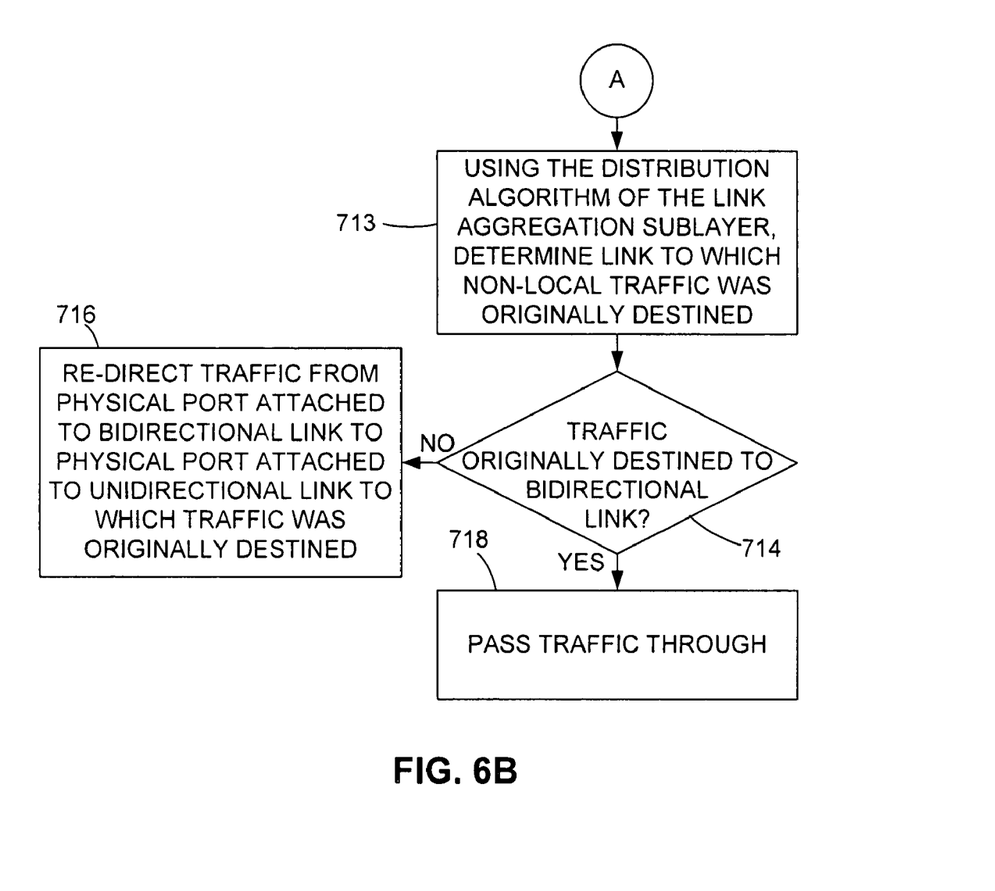
FIG. 6B is a continuation of FIG. 6A.

The (upstream) shim logic 530 operates in accordance with the flow diagram shown in FIG. 6. Persons skilled in the art to which the invention relates will readily be capable of implementing shim logic 530 in suitable hardware, software, firmware, or a combination thereof, and integrating it into otherwise conventional communication protocol stack logic 502 in a manner that causes bridge 500 to operate in accordance with the method indicated in FIG. 6. As illustrated in FIG. 6, there are two main types of traffic that shim logic 530 operates upon: downstream and upstream. Upstream traffic has two subtypes: local and non-local.

As indicated by steps 702 and 704, in an instance in which (upstream) shim logic 530 receives traffic (arriving in the downstream direction from LAS 514 or any optional layer-2 entity 516), shim logic 530 passes that traffic through. That is, shim logic 530 does not re-direct that downstream traffic. Specifically, with regard to the exemplary embodiment and with further reference to FIG. 4, if shim logic 530 receives such downstream traffic destined to the bidirectional link 506, shim logic 530 passes that traffic through to MAC layer 513 on that link, as indicated by arrow 536; if shim logic 530 receives such downstream traffic destined to the unidirectional link 508, shim logic 530 passes that traffic through to MAC layer 513 on that link, as indicated by arrow 532; and if shim logic 530 receives such downstream traffic destined to the unidirectional link 510, shim logic 530 passes that traffic through to MAC layer 513 on that link, as indicated by arrow 534. Shim logic 530 can include a suitable parser/multiplexer (not shown) that performs this function.

As indicated by steps 706 and 708, in an instance in which (upstream) shim logic 530 receives traffic arriving in the upstream direction from bridge 500', how shim logic 530 operates upon that traffic depends on whether the traffic is local or non-local. If the traffic is local, then shim logic 530 can use the identifier found in traffic (the presence of which was ensured by shim logic 530') to determine which link the traffic was originally destined to (before being directed by shim logic 530' to the physical port attached to the bidirectional link 506), as indicated by step 710. Shim logic 530 can use the identifier to direct local traffic in the manner described above with regard to (downstream) shim logic 530'. Then, whether shim logic 530 passes the traffic through or re-directs it depends upon whether the traffic was originally destined to the bidirectional link 506 or one of the unidirectional links 508 or 510, as indicated by step 714'. That is, as upstream traffic can only arrive on the bidirectional link, if the traffic was originally destined to one of the unidirectional links 508 and 510 then shim logic 530 re-directs that traffic to the physical port attached to that unidirectional link, as indicated by step 716'. If the upstream traffic was originally destined to the bidirectional link 506, shim logic 530 simply passes it through on the physical port attached to the bidirectional link 506, as indicated by step 718'. As indicated by steps 708, 713 and 714, if the traffic is non-local, then whether shim logic 530 passes the traffic through or re-directs it depends upon whether the traffic was originally destined to the bidirectional link 506 or one of the unidirectional links 508 and 510. That is, as upstream traffic can only arrive on the bidirectional link 506, if the traffic was originally destined to one of the unidirectional links 508 or 510 then shim logic 530 re-directs that traffic to the physical port attached to that unidirectional link, as indicated by step 716. If the upstream traffic was originally destined to the bidirectional link 506, shim logic 530 simply passes it through on the physical port attached to the bidirectional link 506, as indicated by step 718.

Specifically, with regard to the exemplary embodiment and with further reference to FIG. 4, if (upstream) shim logic 530 receives such upstream traffic originally destined to the bidirectional link 506, shim logic 530 passes that traffic through to any optional layer-2 entity 516 and LAS 514 on the physical port attached to that link, as indicated by arrow 536; if shim logic 530 receives such upstream traffic originally destined to the unidirectional link 508 (before being redirected by shim logic 530' to the physical port attached to the bidirectional link 506), shim logic 530 re-directs that traffic to any optional layer-2 entity 516 and LAS 514 on the physical port attached to the link to which the traffic was originally destined, as indicated by arrow 538; and if shim logic 530 receives such upstream traffic originally destined to the unidirectional link 510 (before being redirected by shim logic 530' to the physical port attached to the bidirectional link 506), shim logic 530 re-directs that traffic to any optional layer-2 entity 516 and LAS 514 on the physical port attached to the link to which the traffic was originally destined, as indicated by arrow 540.

In the case of upstream non-local traffic, (upstream) shim logic 530 can determine the link to which the traffic was originally destined (before being directed by shim logic 530' to the physical port attached to the bidirectional link 506) in any suitable manner, including the following: based on an identifier; or via the distribution algorithm included in shim logic 530. As known in the art, and as defined by the applicable standards, the LAS includes a Frame Distributor (e.g., Frame Distributor 316 shown in FIG. 3) that performs a frame distribution algorithm. As known in the art, the frame distribution algorithm chooses a link to be used to transmit a frame or set of frames. Although the standard does not specify any particular algorithm, such algorithms are well known to and can be chosen appropriately by persons skilled in the art to which the invention relates and therefore are not described herein in further detail. In accordance with the present invention, shim logic 530 can include logic (not shown) that performs the same conventional frame distribution algorithm as that used by LAS 514 and 514'. If this logic selects the physical port attached to the bidirectional link, a parser/multiplexer (not shown) of shim logic 530 passes such upstream non-local traffic through on the selected physical port. If this logic selects the physical port attached to a particular unidirectional link, the same parser/multiplexer re-directs such upstream non-local traffic from the physical port attached to the bidirectional link to the selected physical port.

As noted above, shim logic 530 can alternatively determine or select the link to which the traffic was originally destined (before being directed by shim logic 530' to the physical port attached to the bidirectional link 506) based on an identifier. The identifier can be one that is "already" present in a non-local traffic packet, i.e., inserted by an entity other than shim logic 530' of bridge 500' or any other network element beyond bridge 500'). Alternatively, the identifier can be one that was provided by (downstream) shim logic 530' of bridge 500'. Shim logic 530' can provide such an identifier in any suitable manner, such as one or more of the following in any suitable combination. One way that shim logic 530' can provide such an identifier is to insert or embed the identifier in a suitable part of a non-local traffic packet that is to be transmitted upstream (e.g., in an unused part of the header or payload). Alternatively, for example, shim logic 530' can include the identifier in a header encapsulating one or more non-local traffic packets that are to be transmitted upstream (e.g., if only one non-local traffic packet is encapsulated, the header could be, for example, a layer-2 header whose source or destination MAC address is used as the identifier; if a plurality of non-local traffic packets are encapsulated, the header could be, for example, extended with a Type Length Value field storing a plurality of such identifiers. In still another alternative way that shim logic 530' can provide such an identifier, shim logic 530' can transmit one or more "announcement" packets upstream that precede one or more non-local traffic packets, where the identifier is included in the announcement packet or packets in one of the ways described above.

As described above, (upstream) shim logic 530 can use the identifier (in some embodiments, after manual or automatic configuration as described above for local traffic) to identify the physical port on bridge 500 to which upstream traffic is to be directed. The identifier can identify the physical port in various suitable ways, such as directly, i.e., by storing such physical port's MAC address, port number, etc., or indirectly, i.e., by storing the MAC address of the peer physical port on (downstream) bridge 500', which MAC address can be matched with the MAC address of the physical port to which upstream traffic is to be directed. For example, shim logic 530 can perform such matching by looking up in a table (not shown) in bridge 500 that stores such MAC address associations.

Although in the embodiment of the invention described above with regard to FIG. 6 (upstream) shim logic 530 distinguishes between local and non-local traffic at step 708 and handles local traffic using an identifier and non-local traffic using an LAS distribution algorithm, in other embodiments the upstream shim logic can handle all traffic, regardless of whether local or non-local, using an identifier. Similarly, although in the embodiment described above with regard to FIG. 5 (downstream) shim logic 530' distinguishes between local and non-local traffic, such downstream shim logic need not be concerned with whether traffic is local or non-local in all embodiments.

Figure 7:
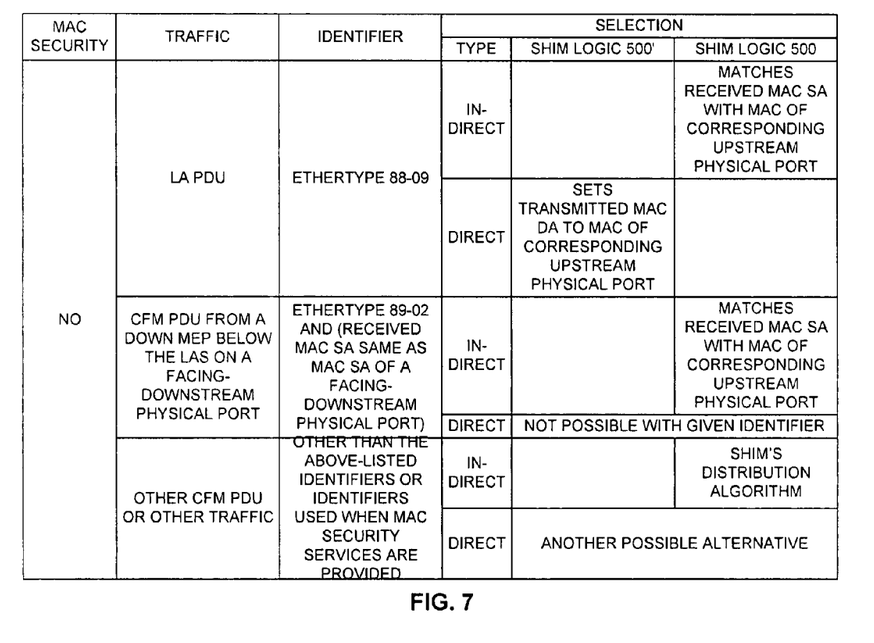
FIG. 7 is a table, illustrating how an identifier can be used for link selection in the exemplary embodiment.

In an embodiment in which (downstream) shim logic 530' replaces some original information in a packet with the above-described identifier, then (upstream) shim logic 530 can, in turn, replace the identifier with the original information. The use of identifiers in the various alternative ways described above is summarized in the table shown in FIG. 7. Also, in instances in which all links in the link aggregation group are protected by MAC Security, selection based on an identifier (rather than on a frame distribution algorithm) may be a more viable alternative, because in such instances non-local traffic would be carried on such links after encapsulation by MAC Security, making the traffic local. With regard to the tables of FIGS. 7-8, it should be noted that LA PDUs include LACPDUs, Marker/Marker Response PDUs, etc. Also, respective subtypes (0x01 for LACP and 0x02 for Marker) can also be included in some instances in the presence of extra "Slow Protocols." It should also be noted that with regard to upstream shim logic 500 and downstream shim logic 500', traffic destined to a bidirectional link needs no alteration (as packets resemble conventional ones) and can simply be let through. Other traffic might require alteration (altered values should be reverted to conventional values if possible) and requires redirection to either the physical port attached to the bidirectional link (on the downstream bridge) or entities on appropriately identified physical port (on the upstream bridge). With regard to an embodiment in which a transmitted MAC Destination Address (DA) is set to the MAC of the corresponding upstream physical port, as indicated in the table of FIG. 7, the altered transmitted MAC DA can indicate direct selection or, alternatively, a conventional MAC DA can indicate indirect selection. Finally, with regard to the use of Ethertype 89-02 as part of the identifier for CFM PDUs noted in the table, such an identifier is sufficient if all Maintenance Points on the facing physical/logical port are below the LAS, have the same MAC address as the physical port they are on, and no two such MAC addresses are identical. If that is not the case in a particular instance or embodiment of the invention, the identifier can be modified so as to allow, for example, the comparison of the received Maintenance Association Identifier (MAID) with the MAID of one of the Down MEPs below the LAS on the set of facing downstream physical ports. Such Down MEPs are conventionally used to protect one of the links in the aggregate, and their MAID uniquely identifies them but is only present in CFM Continuity Check Messages (CCMs). When protecting such links, CCMs should be sufficient.

If MAC Security is enabled on at least one of the links in the link aggregation group, both non-local traffic protected by MAC Security and any local traffic from or two entities (e.g., LAS 514) above the MAC Security layer (an optional layer-2 entity 516) will be encapsulated within a MAC Security PDU (MPDU) with Ethertype 88-E5. An optional but unique MAC Security identifier, the Secure Channel Identifier (SCI), can be used on a per-link basis to uniquely match such encapsulated traffic with the MAC Security entities (e.g., MAC Security "SecYs") associated with such SCI on each side of any such link in the link aggregation group. Likewise, upstream traffic related to other protocols enabled within the MAC Security framework (e.g., "Key Agreement" traffic, "Extensible Authentication Protocol Over LAN" traffic, etc.) can be handled by the (upstream) shim logic 530 with proper identification and selection. Other upstream traffic (e.g., upstream traffic on links where MAC Security is not enabled) is subjected to selection as described above.

Link failure can be handled in, for example, the following manner. Upon detection of a link failure on the bidirectional link, both (upstream) shim logic 530 and (downstream) shim logic 530' can independently stop forwarding or discard all traffic until the bidirectional link is operational again. Upon detection of a link failure on a unidirectional link, shim logic 530 and 530' can both independently stop forwarding or discard traffic destined to or originating from the unidirectional link at fault until the link is operational again. Accordingly, shim logic 530 and 530' update conventional parameters of the types that such entities typically update. For example, upon detection of a link failure on the bidirectional link, shim logic 530 and 530' set the other links' MAC_Operational parameter to FALSE, as on the bidirectional link.

Although in the above-described exemplary embodiment of the invention there is only a single bidirectional link 506, it should be appreciated that other embodiments (not shown for purposes of clarity) can have two or more bidirectional links.

In order for the ordering to be maintained among a set of upstream non-local traffic packets, such a set (sometimes referred to as a "conversation") could be transmitted on only one of the bidirectional links, the choice of which would be made by a distribution algorithm or an administratively configured association mechanism local to (downstream) shim logic 530'. Upstream local traffic should be transmitted on the same bidirectional link as the corresponding upstream non-local traffic.

Link failure in embodiments having a plurality of bidirectional links could be handled in the manner described above, except that upon detection of a link failure on one of the bidirectional links, both shim logic 530 and 530' could independently stop forwarding or discard only the traffic destined to or originating from that bidirectional link until that link is operational again. If all bidirectional links fail, shim logic 530 and 530' could independently stop forwarding or discard all traffic until at least one bidirectional link is operational again.

Figure 8:
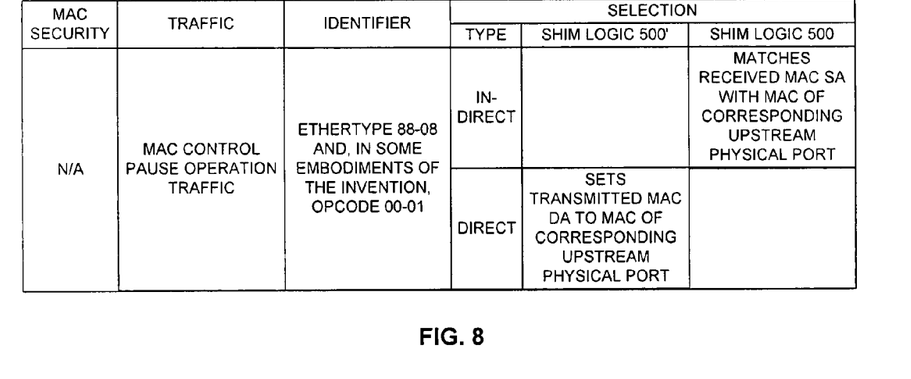
FIG. 8 is another table, illustrating how an identifier can be used for link selection in an alternative embodiment in which the shim logic is lower in the protocol stack.

Although in the above-described exemplary embodiment of the invention, shim logic 530 and 530' are above the MAC layer 513 and 513', in other embodiments they could be disposed at a lower level so as to accommodate traffic from or to entities in the MAC layer as well. For example, the present invention could be applied to the MAC Control PAUSE operation as specified in IEEE Std. 802.3™-2005 Clause 31 and Annexes 31A and 31B. Selection based on an identifier could be used as indicated in FIG. 8. The identifier could encompass the protocol's Ethertype (88-08) (and possibly OpCode 00-01, allowing traffic to be distinguished from other traffic with the same Ethertype) and the conventional destination MAC address 01-80-C2-00-00-01 could be replaced in the downstream shim logic by the MAC address of the destination physical port on the upstream bridge for lookup by the upstream shim logic. Alternatively, the source MAC address of the physical port on the downstream bridge could be matched by the upstream shim logic with the MAC address of the destination physical port on the upstream bridge. Finally, it should be appreciated that the MAC Control PAUSE operation, because it is implemented below the MAC Security level, is independent of it and therefore no alternative identification is required.

In the manner described above, link aggregation and other layer-2 protocols can operate fully in network deployments in which bridges or other network devices have primarily unidirectional links. An Internet Protocol television (IPTV) network that delivers IPTV programming to subscribers is one example of such a network deployment that could benefit from having the vast majority of its links be of the unidirectional variety and a lesser number of links be of the less economical bidirectional variety.

It will be apparent to those skilled in the art that various modifications and variations can be made to this invention without departing from the spirit or scope of the invention. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for transferring traffic through a network device having communication protocol stack logic and a plurality of physical ports attached to a unidirectional link capable of receiving traffic in only a first direction and not capable of transmitting traffic in a second direction and a bidirectional link capable of receiving traffic in the first direction and transmitting traffic in the second direction, the communication protocol stack logic including shim logic, the method comprising the steps of:

the shim logic receiving traffic in the first direction from a plurality of physical ports attached to unidirectional and bidirectional links;

the shim logic transmitting traffic in the second direction to a physical port attached to the bidirectional link even if the traffic is destined to a unidirectional link;

the shim logic determining to which of the physical ports attached to the unidirectional and bidirectional links traffic arriving in the second direction is destined; and the shim logic passing the traffic arriving in the first direction through on the physical port attached to a link on which the traffic arrives;

wherein the shim logic is located in a Link Aggregation Sublayer (LAS) of the communication protocol stack logic or between the LAS and a MAC layer of the communication protocol stack logic.

2. The method claimed in claim 1, further comprising if it is determined that the traffic arriving at the shim logic in the second direction is destined to the physical port attached to the bidirectional link, the shim logic:

ensuring an identifier is present in traffic; and passing the traffic through on the physical port attached to the bidirectional link; and if it is determined that the traffic arriving at the shim logic in the second direction is destined to the physical port attached to the unidirectional link, the shim logic:

ensuring an identifier is present in traffic; and directing the traffic to the physical port attached to the bidirectional link.

3. The method claimed in claim 1, wherein the shim logic further determines whether the traffic arriving at the shim logic in the second direction is local or non-local and if it is determined that said traffic arriving at the shim logic is non-local, the shim logic directing said traffic to the physical port attached to the bidirectional link without ensuring an identifier is present in traffic; and if it is determined that said traffic arriving at the shim logic is local, the shim logic directing said traffic to the physical port attached to the bidirectional link ensuring an identifier is present in traffic.

4. The method claimed in claim 3, wherein the step of the shim logic determining whether the traffic arriving at the shim logic in the second direction is local or non-local comprises determining that the traffic is non-local if a distribution algorithm of the Link Aggregation Sublayer in the communication protocol stack logic can direct said traffic.

5. A method for transferring traffic through a network device having communication protocol stack logic and a plurality of physical ports attached to a unidirectional link capable of transmitting traffic in only a first direction and not capable of receiving traffic in a second direction and a bidirectional link capable of transmitting traffic in the first direction and receiving traffic in the second direction, the communication protocol stack logic including shim logic, the method comprising the steps of:

the shim logic transmitting traffic in the first direction to the plurality of physical ports attached to the unidirectional and bidirectional links;

the shim logic receiving traffic in the second direction on a physical port attached to the bidirectional link;

the shim logic determining to which of the unidirectional and bidirectional links traffic arriving in the second direction on the physical port attached to the bidirectional link was originally destined; and the shim logic directing traffic arriving in the second direction to the physical port attached to the determined link;

wherein the shim logic is located in a Link Aggregation Sublayer (LAS) of the communication protocol stack logic or between the LAS and a MAC layer of the communication protocol stack logic.

6. The method claimed in claim 5, further comprising:
the shim logic determining whether the traffic arriving at the shim logic in the second direction is local or non-local; and
if it is determined that said traffic arriving at the shim logic is non-local, the shim logic:
  determining a link to which said traffic was originally destined by applying a distribution algorithm to said traffic; and
  directing said traffic to the physical port attached to the determined link; or if it is determined that said traffic arriving at the shim logic is local, the shim logic:
  determining a link to which the traffic was originally destined in response to an identifier; and
  directing said traffic to the physical port attached to the determined link.

7. The method claimed in claims 6, wherein the step of the shim logic determining to which of the unidirectional or bidirectional links traffic arriving in the second direction on the physical port attached to the bidirectional link was originally destined is performed in response to an identifier.

8. The method claimed in claim 7, wherein the step of the shim logic determining to which of the unidirectional or bidirectional links traffic arriving in the second direction on the physical port attached to the bidirectional link was originally destined is performed in response to a distribution algorithm if said traffic is non-local.

9. The method claimed in claim 6, wherein the distribution algorithm is a distribution algorithm of the Link Aggregation Sublayer in the communication protocol stack logic and wherein the step of the shim logic determining whether the traffic arriving at the shim logic in the second direction is local or non-local comprises determining that the traffic is non-local if the distribution algorithm can direct the traffic.

10. The method claimed in claim 6, wherein the identifier is included in a portion of the traffic packet of the traffic arriving at the shim logic in the second direction.

11. The method claimed in claim 6, wherein the identifier is included in at least one announcement packet preceding at least one traffic packet of the traffic arriving in the second direction.

12. A network device, comprising:
a plurality of physical ports;
communication protocol stack logic for supporting a unidirectional link capable of receiving traffic on a physical port in only a first direction and not capable of transmitting traffic in a second direction and a bidirectional link capable of receiving traffic in the first direction and transmitting traffic in the second direction;
shim logic in the communication protocol stack logic and located in a Link Aggregation Sublayer (LAS) of the communication protocol stack logic or between the LAS and a MAC layer of the communication protocol stack logic, the shim logic being programmed or configured to cause the network device to:
  receive traffic in the first direction from a plurality of physical ports attached to unidirectional and bidirectional links;
  transmit traffic in the second direction to a physical port attached to the bidirectional link even if the traffic is destined to a unidirectional link;
  determine to which of the physical ports attached to the unidirectional and bidirectional links traffic arriving in the second direction is destined; and
  pass the traffic arriving in the first direction through on the physical port attached to a link on which the traffic arrives.

13. The network device claimed in claim 12, wherein if it is determined that the traffic arriving at the shim logic in the second direction is destined to the bidirectional link, the shim logic is further programmed or configured to:
ensure an identifier is present in traffic; and
pass the traffic through on the physical port attached to the bidirectional link; and
if it is determined that the traffic arriving at the shim logic in the second direction is destined to the unidirectional link, the shim logic:
ensure an identifier is present in traffic; and
direct the traffic to the physical port attached to the bidirectional link.

14. The network device claimed in claim 12, wherein the shim logic is further programmed or configured to:
determine whether the traffic arriving at the shim logic in the second direction is local or non-local; and
if it is determined that said traffic arriving at the shim logic is non-local:
  determine a link to which said traffic was originally destined by applying a distribution algorithm to said traffic; and
  direct said traffic to the physical port attached to the determined link;
if it is determined that said traffic arriving at the shim logic is local:
  determine a link to which the traffic was originally destined in response to an identifier; and
  direct said traffic to the physical port attached to the determined link.

15. The network device claimed in claim 14, wherein the shim logic determines whether the traffic arriving at the shim logic in the second direction is local or non-local by determining that the traffic is non-local if a distribution algorithm of the Link Aggregation Sublayer in the communication protocol stack logic can direct said traffic.

16. The network device claimed in claim 14, wherein the distribution algorithm is a distribution algorithm of the Link Aggregation Sublayer in the communication protocol stack logic and wherein the shim logic determines to which of the unidirectional or bidirectional links traffic arriving in the second direction on the physical port attached to the bidirectional link was originally destined in response to the distribution algorithm if said traffic is non-local.

17. The network device claimed in claim 14, wherein shim logic determines to which of the unidirectional or bidirectional links traffic arriving in the second direction on the physical port attached to the bidirectional link was originally destined in response to an identifier if said traffic is local.

18. The network device claimed in claim 17, wherein the identifier is included in a portion of the traffic packet of the traffic arriving at the shim logic in the second direction.

19. The network device claimed in claim 17, wherein the identifier is included in at least one announcement packet preceding at least one traffic packet of the traffic arriving in the second direction.

* * * * *